(No Model.) 3 Sheets—Sheet 1.
A. W. ZIMMERMAN.
ANTI-FRICTION BOLSTER BEARING FOR CAR BODIES.
No. 460,170. Patented Sept. 29, 1891.
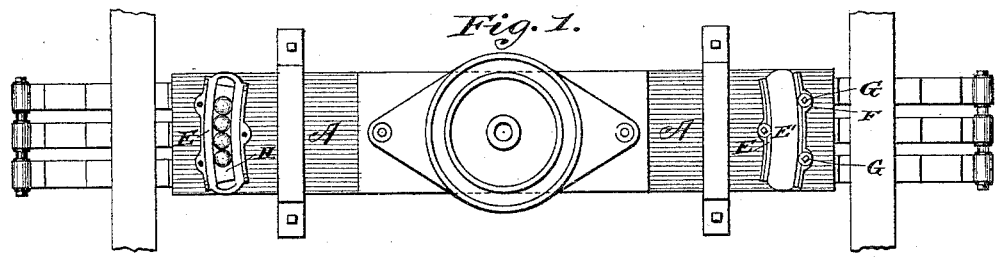
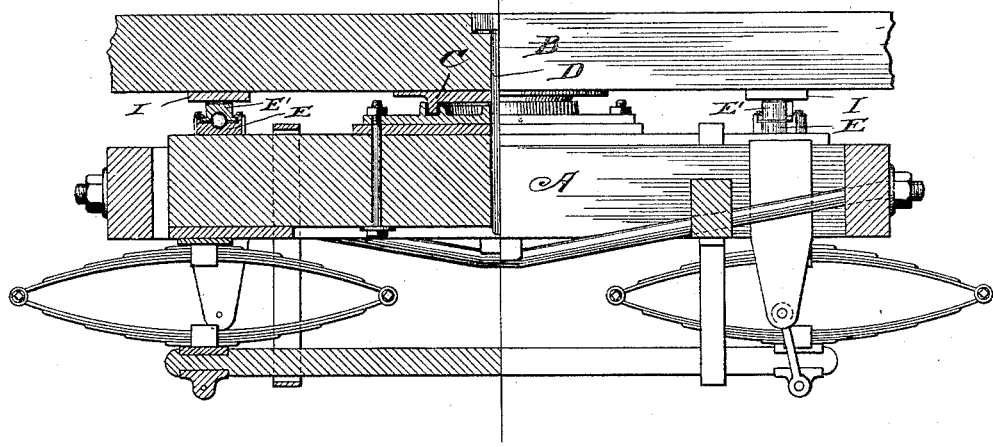

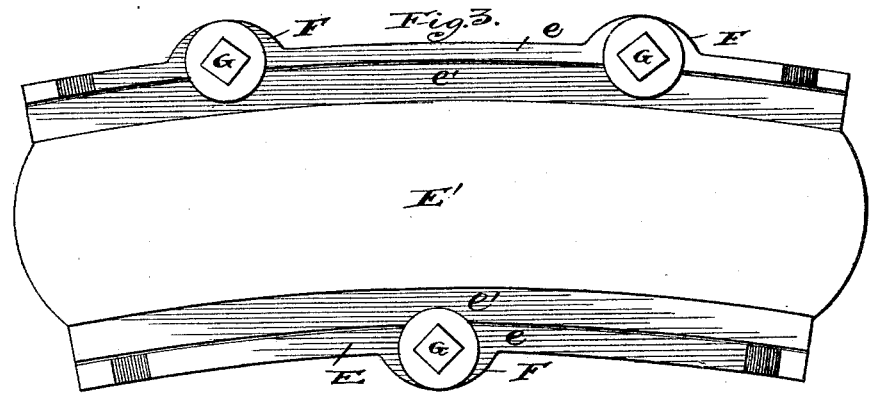
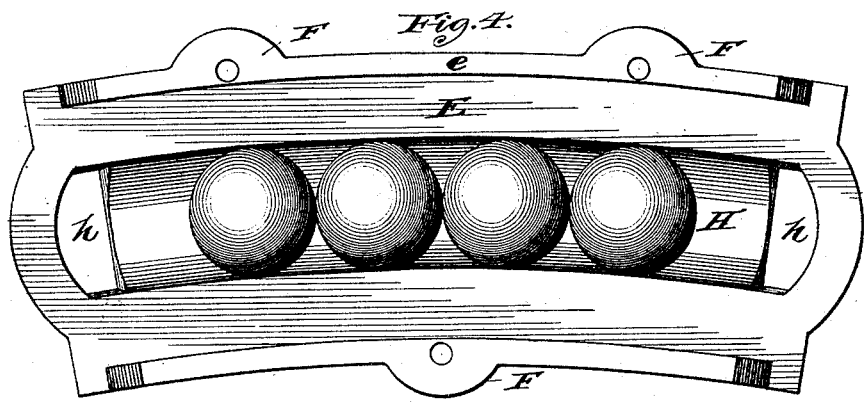
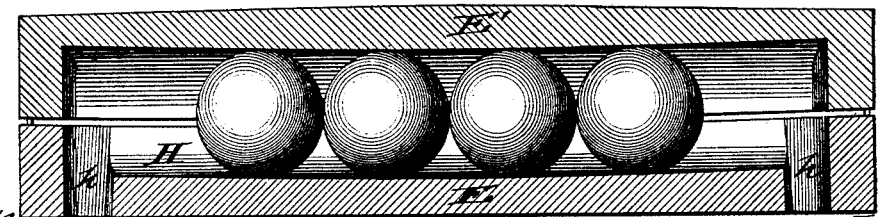

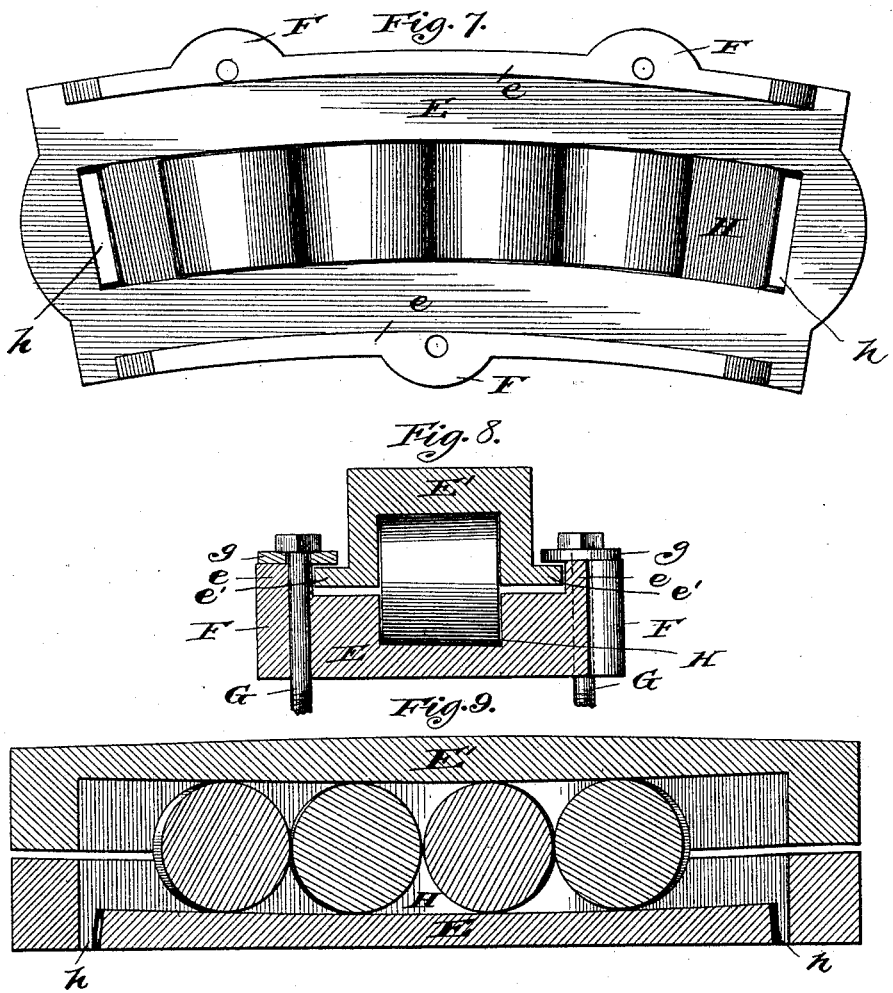

UNITED STATES PATENT OFFICE.

ARNOLD W. ZIMMERMAN, OF WASHINGTON HEIGHTS, ASSIGNOR OF ONE-HALF TO THE CAR TRUCK SUPPLY COMPANY, OF CHICAGO, ILLINOIS.

ANTI-FRICTION BOLSTER-BEARING FOR CAR-BODIES.

SPECIFICATION forming part of Letters Patent No. 460,170, dated September 29, 1891.

Application filed March 3, 1891. Serial No. 383,568. (No model.)

*To all whom it may concern:*

Be it known that I, ARNOLD W. ZIMMERMAN, a citizen of the United States, residing at Washington Heights, in the county of Cook and State of Illinois, have invented certain new and useful Improvements in Anti-Friction Bolster-Bearings, of which the following is a specification.

My invention relates to anti-friction bearings for the ends of car-bolsters; and it has for its object to provide a bearing which will reduce the friction to a minimum and which is adapted to be applied without special preparation of the bolsters to trucks already in use and without any expense other than the bearing itself.

In carrying out my invention I secure the bearings upon the outer ends of the truck-bolster, each bearing consisting of two members having a way formed in their opposing faces and the lower one being provided with suitable fastenings to secure it to the truck-bolster, and the upper bearing member being adapted to slide with relation to the lower, but confined so as to prevent its lateral or longitudinal separation therefrom. The faces of each bearing member has a curved groove therein to provide a race or way within which are placed travelers consisting of balls or short cylindrical rollers. The ways are of such length that the balls or rollers may travel therein from end to end of the ways. The body-bolster projects over the movable member of the bearing, and when the truck is running straight, the car being loaded evenly on its respective sides, the weight will be distributed between the center and end bearings. In rounding curves the truck-bolster of course turns out of line with the body-bolster and the upper member of the bearing moves with the body-bolster, riding on the balls or rollers which travel in the ways, those of one bearing moving forwardly and those of the other backwardly. The upper bearing has the ends of its curved way closed, and the result of this construction is that if the balls or rollers should be distributed unequally in the way said closed ends will engage the last of the series and bring the members of the series into contact, thus always maintaining them in proper position.

In the accompanying drawings, Figure 1 is a plan view of a portion of the car-truck to which my invention is applied, the upper member of the bearing removed. Fig. 2 is a vertical elevation of the bolsters and bearings, partly in section. Fig. 3 is a plan view of the bearing detached. Fig. 4 is a plan view of the lower member of the bearing, showing the balls in place. Fig. 5 is an inverted plan view of the upper bearing. Fig. 6 is a longitudinal section of the bearings; and Figs. 7, 8, and 9 are views showing a modification wherein short cylindrical rolls are employed instead of balls, the bearings being otherwise the same as shown in the previous figures.

In the drawings, A represents the truck-bolster, and B the body-bolster, which have the usual center bearing C and king-bolt D.

E represents the lower member of the side bearing, which may be cast or swaged or made from pressed steel and provided at its side margins with the upwardly-projecting flanges e and the bolt-lugs F, whereby it may be secured to the lower bolsters by means of the bolts G. In the face of this bearing is the curved groove or way H, the ends of which are closed to limit or confine the balls, and the ways have apertures h to permit the escape of dust therefrom. The upper member E' is curved longitudinally and is fitted to slide between the flanges e of the lower bearing member, and it has on its lower edges the outwardly-extending flanges e'. The upper bearing may be restrained from complete separation from the lower member by means of washers g on the bolts G, which secure the lower bearing member to the truck-bolster, and the upper bearing is grooved on its upper face and adapted to rest upon the balls or rollers in the ways of the lower bearing. These ways are of such length that the balls or rollers may have a traveling movement therein as distinguished from a movement about their own axis, and they are moved from end to end of their ways as the truck-bolster turns out of line with the body-bolster. The ends of the body-bolster project so as to rest upon the upper bearing members, either directly or the ends of the upper bolster may carry friction plates or blocks I. The ways of the upper bearing are closed at their ends, and during the movement of this member the balls or rollers are collected or kept in contact with each other. The groove in the lower bearing, in addition to being curved in the direction of the movement of the balls, is hollowed out or depressed toward its middle, so that the balls or rollers will collect or gravitate toward the center of the bearing, as shown in Fig. 6. Instead of the balls, short cylindrical rollers such as shown in Figs. 7, 8, and 9 may be employed; but in such case these rollers must be of substantially the same diameter as they are in length, as otherwise they would not guide and turn themselves to follow the curved path rendered necessary by the movement of the truck. I prefer the construction wherein the balls are employed.

It is evident that these bearings may be applied to the trucks of cars already in service, and that no special preparation of the bolsters need be made therefor, and that the bolsters of most freight-cars will work with standard trucks having these bearings applied thereto, thus enabling the interchange of car bodies and trucks, while preserving the end bearings for the bolsters.

The bearings above described obviate friction at the ends of the bolster, as it is obvious that there are no parts sliding upon each other in frictional contact, and permit a free and independent motion of the truck in turning curves, thus greatly reducing the destructive effects of crowding or riding of the flanges of the wheels upon the sides of the rails.

My invention is not limited to the details of construction relating to the manner of securing the lower member of the bearing to the truck-bolster, nor to the means described for confining the upper member to the lower.

The way may be formed in the lower bearing member only, the upper member consisting of a flat sliding plate having its endwise movement by suitable stops.

I claim—

1. An anti-friction side bearing for car-body bolsters, comprising a bearing member to be secured upon the outer end of the truck-bolster and having a curved way therein, and a series of independent travelers in said way, and a bearing member adapted to rest loosely upon the travelers and having a sliding connection with the fixed member and adapted to receive the end of the body-bolster, substantially as described.

2. An anti-friction bearing for the ends of car-body bolsters, composed of a member to be fixed to the truck-bolster and having a curved way therein, a series of independent travelers, and a member also curved and resting upon the travelers and adapted to provide a bearing for the end of the body-bolster, substantially as described.

3. In an anti-friction bearing for car-body bolsters, the combination, with a bearing member having a curved way therein and adapted to be secured to the truck-bolster, of an upper member resting upon a series of independent travelers adapted to move in said way and to support the upper bearing member with its superposed load, substantially as described.

4. In an anti-friction bearing for car-body bolsters, the combination, with the bearing members having in their opposing faces curved ways, of a series of independent travelers moving in said ways, said ways being of such length as to permit of the travel of the anti-friction devices therein in the direction of movement of the upper member, substantially as described.

5. In an anti-friction bearing for car-body bolsters, the combination, with the upper and lower bearing members, each having curved ways therein, of a series of independent travelers moving in said ways, the way of the upper member being closed at its ends, whereby to huddle or collect the travelers, substantially as described.

6. In an anti-friction bearing for car-body bolsters, the combination, with the upper and lower members having curved ways in their opposing faces, of a series of independent travelers moving in said ways, the way of the lower member being hollowed toward its middle, whereby to collect the series of travelers toward the center of the bearing, substantially as described.

7. In an anti-friction bearing for car-body bolsters, the combination, with the upper and lower members having a curved way, of a series of independent travelers moving in said way, the lower of said bearings having an aperture to provide an outlet for dust, substantially as described.

8. In an anti-friction bearing, the combination, with a lower member to be secured to the truck-bolster and having a curved way therein and upwardly-extending curved marginal flanges, of an upper member having also a curved way therein and adapted to be guided by the flanges of the lower member and a series of independent travelers adapted to said way, substantially as described.

9. In an anti-friction-bolster bearing for car-truck bolsters, the combination, with the lower member having upwardly-extending curved flanges to form a way for the upper member, said upper member having laterally-extending flanges, of means connected with the lower member and projected over the flange upon the upper, whereby to retain it in its way, and a series of independent travelers, substantially as described.

ARNOLD W. ZIMMERMAN.

Witnesses:
FREDERICK C. GOODWIN,
C. C. LINTHICUM.